United States Patent
Mollhagen (10) Patent No.: US 12,520,814 B2
(45) Date of Patent: Jan. 13, 2026

(54) APPARATUS FOR ASSISTING THE FORWARD MOVEMENT OF LIVESTOCK

(71) Applicant: Jon Davis Mollhagen, Lorraine, KS (US)

(72) Inventor: Jon Davis Mollhagen, Lorraine, KS (US)

( * ) Notice: Subject to any disclaimer, the term of this patent is extended or adjusted under 35 U.S.C. 154(b) by 0 days.

(21) Appl. No.: 18/635,360

(22) Filed: Apr. 15, 2024

(65) Prior Publication Data
US 2025/0000049 A1 Jan. 2, 2025

Related U.S. Application Data

(63) Continuation of application No. 17/557,570, filed on Dec. 21, 2021, now abandoned.

(60) Provisional application No. 63/188,408, filed on May 13, 2021, provisional application No. 63/128,247, filed on Dec. 21, 2020.

(51) Int. Cl.
*A01K 1/00* (2006.01)

(52) U.S. Cl.
CPC .................. *A01K 1/0029* (2013.01)

(58) Field of Classification Search
CPC ..... A01K 1/0029; A01K 1/0613; A01K 15/04
USPC .................................................. 119/712–849
See application file for complete search history.

(56) References Cited

U.S. PATENT DOCUMENTS

| | | | | |
|---|---|---|---|---|
| 3,572,294 A | * | 3/1971 | Baker ................... | A01K 1/0613 119/517 |
| 3,805,741 A | * | 4/1974 | Thompson ........... | A01K 1/0029 119/843 |
| 4,444,150 A | * | 4/1984 | Hueftle ................... | A61D 3/00 119/516 |
| 5,203,280 A | * | 4/1993 | Nelson ................... | A01K 15/00 119/14.03 |
| 5,285,746 A | * | 2/1994 | Moreau ................... | A01K 1/12 119/752 |
| 6,176,203 B1 | * | 1/2001 | Rousseau ............. | A01K 15/028 119/517 |

(Continued)

FOREIGN PATENT DOCUMENTS

| | | | | |
|---|---|---|---|---|
| CN | 110012845 A | * | 7/2019 | ........... A01K 15/003 |
| GB | 2023397 A | * | 1/1980 | ............. A01K 15/04 |

(Continued)

*Primary Examiner* — Peter M Poon
*Assistant Examiner* — Hae Rie Jessica Byun
(74) *Attorney, Agent, or Firm* — Robert O. Blinn (57) ABSTRACT

An apparatus for assisting the forward movement of animals in a livestock alleyway includes a pivot structure, an actuator and an arm assembly. The pivot structure is rotatably mounted to the alleyway. The actuator connects between the alleyway and the pivot structure for rotating the pivot structure between first and second positions. The arm assembly is pivotably mounted to the pivot structure for rotation between a first extended position and a second retracted position. The arm assembly is biased toward the first extended position and is able to extend and retract in a telescoping fashion. The pivot structure and the arm assembly are arranged for positioning above livestock animals in the alleyway and yet also for pivoting from such a retracted position to a position for urging the forward movement of a livestock animal without interfering with an animal that may be positioned under the apparatus.

3 Claims, 9 Drawing Sheets

(56) References Cited

U.S. PATENT DOCUMENTS

| | | | |
|---|---|---|---|
| 7,213,539 B1 * | 5/2007 | Mollhagen | A01K 1/0029 119/843 |
| 7,644,681 B2 * | 1/2010 | Moreau | A01K 1/12 119/524 |
| 7,810,450 B2 * | 10/2010 | Sensenig | A01K 1/0017 119/14.03 |
| 10,765,085 B1 * | 9/2020 | Studebaker, Jr. | A01K 1/0613 |
| 2003/0140870 A1 * | 7/2003 | Daniels | A01K 1/0613 119/752 |
| 2009/0064941 A1 * | 3/2009 | Daniels | A01K 1/0613 119/512 |
| 2015/0201587 A1 * | 7/2015 | Brayer | A01K 1/0029 119/769 |
| 2016/0235037 A1 * | 8/2016 | Monks | A01K 15/04 |
| 2018/0042200 A1 * | 2/2018 | Gipson | A01K 1/0613 |
| 2019/0008115 A1 * | 1/2019 | Coker | A01K 1/0029 |
| 2019/0191666 A1 * | 6/2019 | Amos | A01K 1/0613 |

FOREIGN PATENT DOCUMENTS

| | | | | |
|---|---|---|---|---|
| GB | 2172786 A | * | 10/1986 | A01K 15/04 |
| WO | WO-2020050087 A1 | * | 3/2020 | A01K 29/00 |

* cited by examiner

ND FORWARD MOVEMENT OF LIVESTOCK

APPARATUS FOR ASSISTING THE FORWARD MOVEMENT OF LIVESTOCK

CROSS REFERENCES TO RELATED APPLICATIONS

This application is a continuation of U.S. non-provisional patent application Ser. No. 17/557,570 which was filed on 21 Dec. 2021 and which is incorporated herein by reference in its entirety as if repeated verbatim hereinafter.

U.S. non-provisional patent application Ser. No. 17/557,570 claimed the benefit of U.S. Provisional Patent Application 63/188,408 filed on May 13, 2021 and this application also claims the benefit of U.S. Provisional Patent Application 63/128,247 filed on Dec. 21, 2020, both of which are incorporated herein by reference as if repeated verbatim hereinafter.

FIELD

The present invention relates to an apparatus that is used in connection with a livestock alleyway to assist the forward movement of a livestock animal through the alleyway.

BACKGROUND

Livestock alleyways are typically arranged to restrict animals into a single file line and are sufficiently narrow to prevent animals from turning around. In the past, a device knows as a "no back" might be employed that is arranged to allow an animal to move forward but restricts the animal from moving backward. But, even so, it is common for an animal to stop moving which requires the intervention of a human operator who will often push or prod the animal. Such human operator interventions take time and entail risk. What is needed is an apparatus that may be mounted to livestock alleyways that do not restrict forward movement, but then could be activated to push the animal forward in an alleyway.

SUMMARY

The above noted need is addressed by a forward movement assist apparatus for assisting the forward movement of livestock animals in a livestock alleyway of the type having a frame that supports narrowly spaced side walls that define a narrow passageway for allowing the single file movement of livestock animals. The forward movement assist apparatus includes a pivot structure, an arm assembly and an actuator. The pivot structure is rotatably mounted at least indirectly to the side walls of the alleyway. The pivot structure is able to rotate about a first axis that is generally normal to the sidewalls of the alleyway. The actuator connects between the alleyway frame at least indirectly and the pivot structure. The actuator is able to rotate the pivot structure between a first pivot structure position and a second pivot structure position. The arm assembly has a first proximal end and a second distal end. The arm assembly is pivotably mounted to the pivot structure at its proximal end so that it is able to rotate with respect to the pivot structure about a second axis that is also generally normal to the sidewalls of the alleyway between a first extended position and a second retracted position. The arm assembly is also biased toward the first extended position. A paddle attachment is fixed to the distal end of the arm assembly. The pivot structure and the arm assembly are arranged so that a livestock animal moving through the alleyway will encounter the paddle attachment and be able to push the paddle attachment and the arm assembly up toward the second retracted position and pass underneath the arm assembly as it moves forward in the alleyway. The pivot structure and the arm assembly are also arranged so that when the arm assembly is in the first retracted position with respect to the pivot structure it is able to be rotated by the pivot structure to cause contact of the paddle attachment with rear of the livestock animal thereby urging the animal forward in the alleyway as the pivot structure is rotated from the first pivot structure position toward the second pivot structure position.

DETAILED DESCRIPTION

Figure 1:
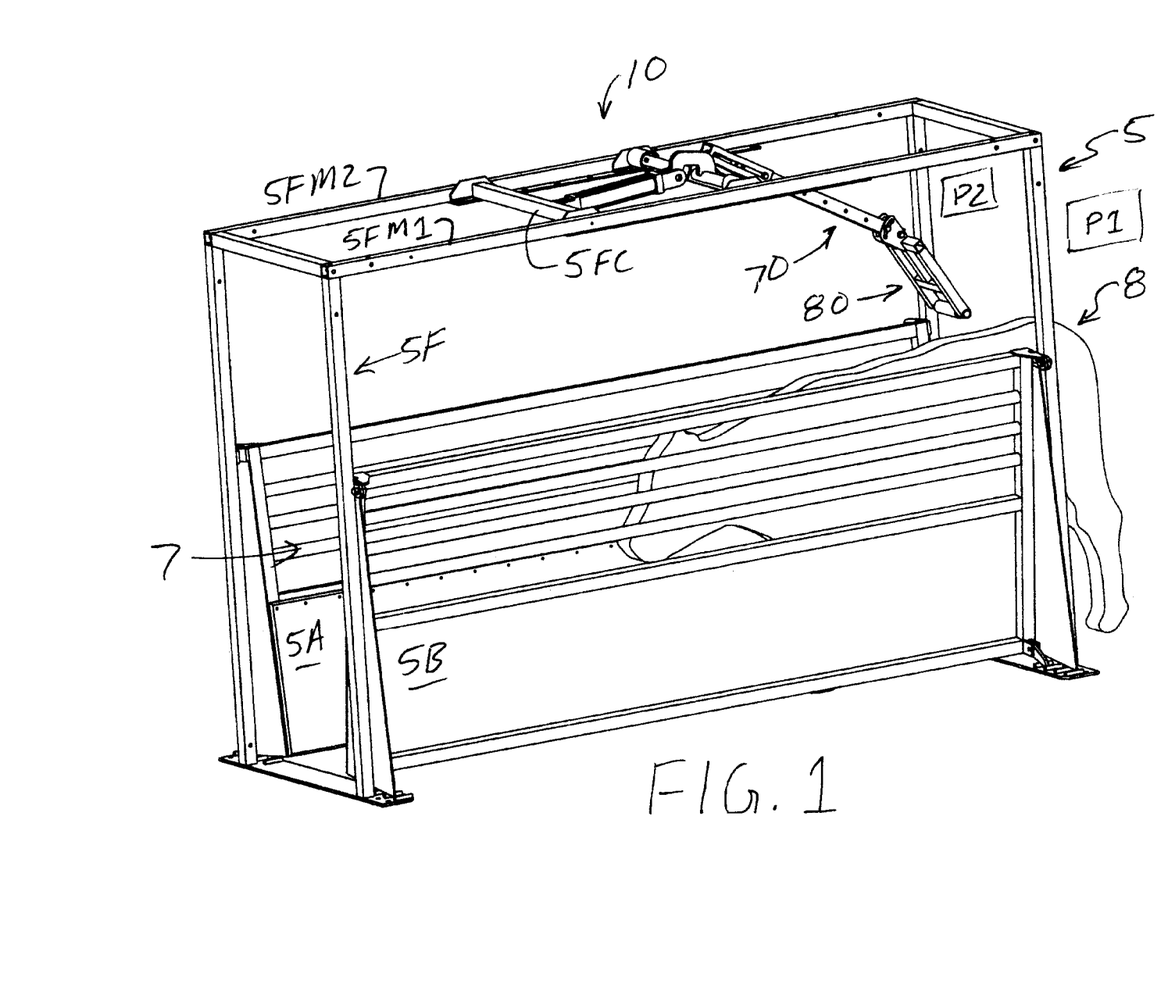
FIG. 1 is a perspective view of one embodiment of the forward movement assist apparatus 10 shown mounted in a livestock alleyway.
Figure 2:
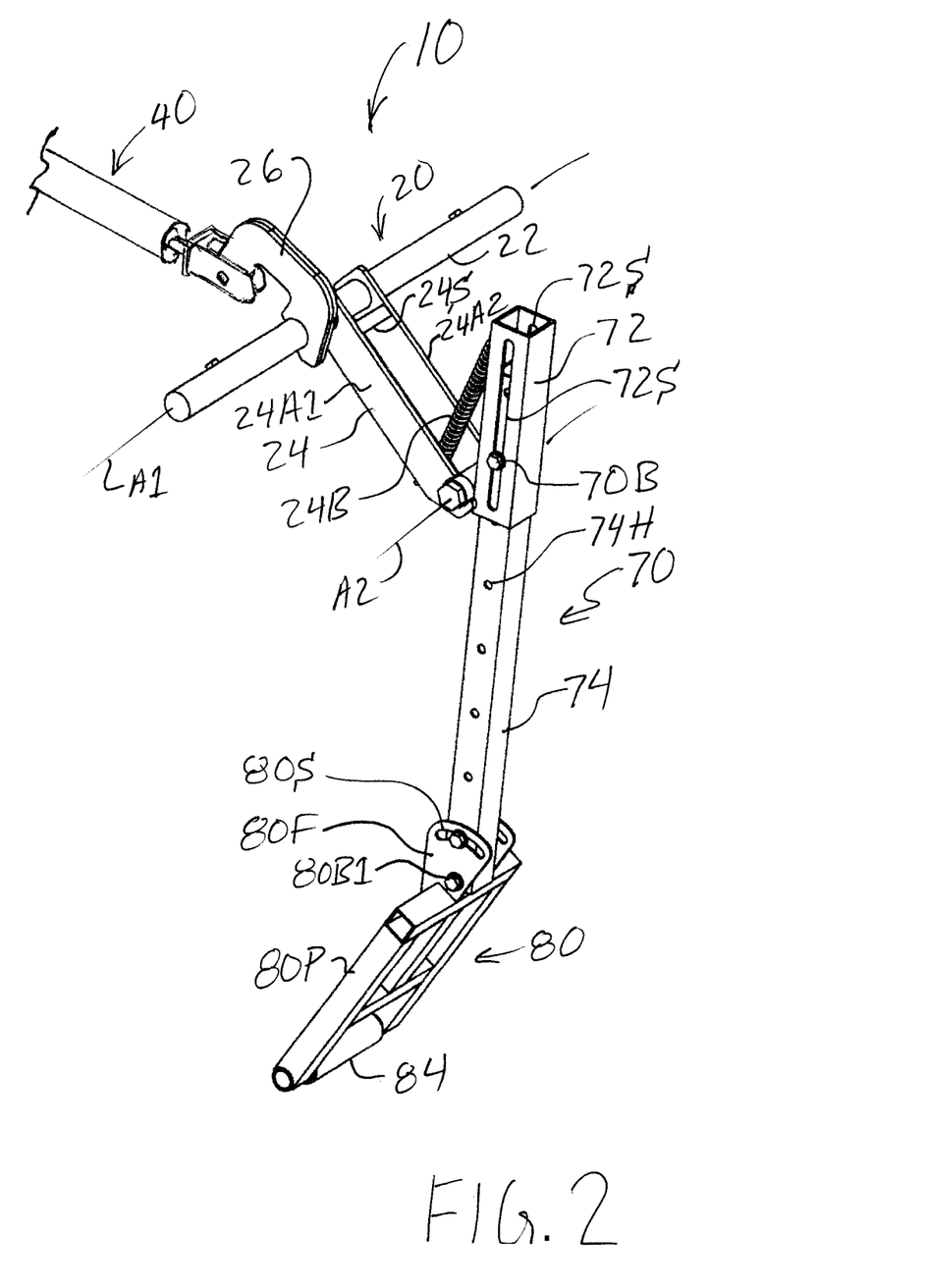
FIG. 2 is a perspective view of one embodiment of the forward movement assist apparatus 10.

Referring to the drawings, FIGS. 1 and 2 show one embodiment of a forward movement assist apparatus 10 which is mounted to a livestock alleyway 5. As can be seen in FIG. 1 livestock alleyway 5 is of the type having narrowly spaced sidewalls 5A and 5B that are mounted within a frame 5F. Sidewalls 5A and 5B define a narrow passageway 7 for allowing the single file movement of a livestock animals 8. In this example, alleyway 5 includes a rectangular frame 5F that supports sidewalls 5A and 5B. Further frame 5F may be considered as defining an envelope that is bounded, in part by two frame side planes P1 and P2. Still further, frame 5F, in this example, includes two parallel, spaced upper longitudinal members 5FM1 and 5FM2. As can be best seen in FIG. 2, forward movement assist apparatus 10 includes a pivot structure 20, an actuator 40 and an arm assembly 70.

Pivot structure 20 is rotatably mounted to the upper longitudinal members 5FM1 and 5FM2 of frame 5F of alleyway 5. In this example, pivot structure 20 includes a pivot shaft 22, a pivot arm 24 and an actuator arm 26. In this example, pivot shaft 22 is rotatably mounted at least indirectly to upper longitudinal members 5FM1 and 5FM2 of alleyway frame 5F for rotation about an axis A1. Axis A1 is generally normal to frame side planes P1 and P2. Pivot arm 24 is fixed to pivot shaft 22 and extends away from pivot shaft 22. The distal end of pivot arm 24 carries arm assembly 70 which will be described in detail below.

Figure 4:
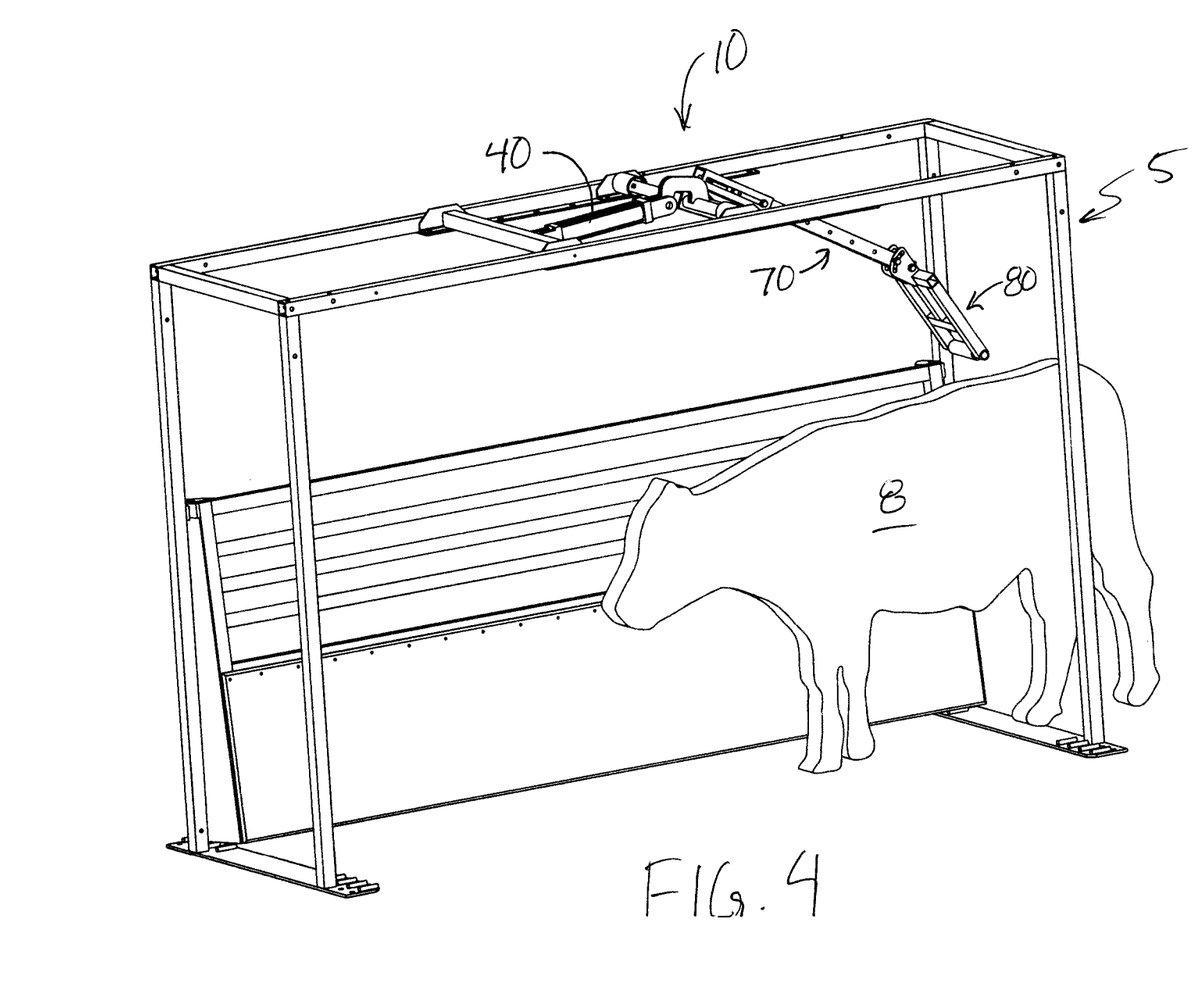
FIG. 4 shows the forward movement assist apparatus in a first position in which the actuator is fully retracted.
Figure 7:
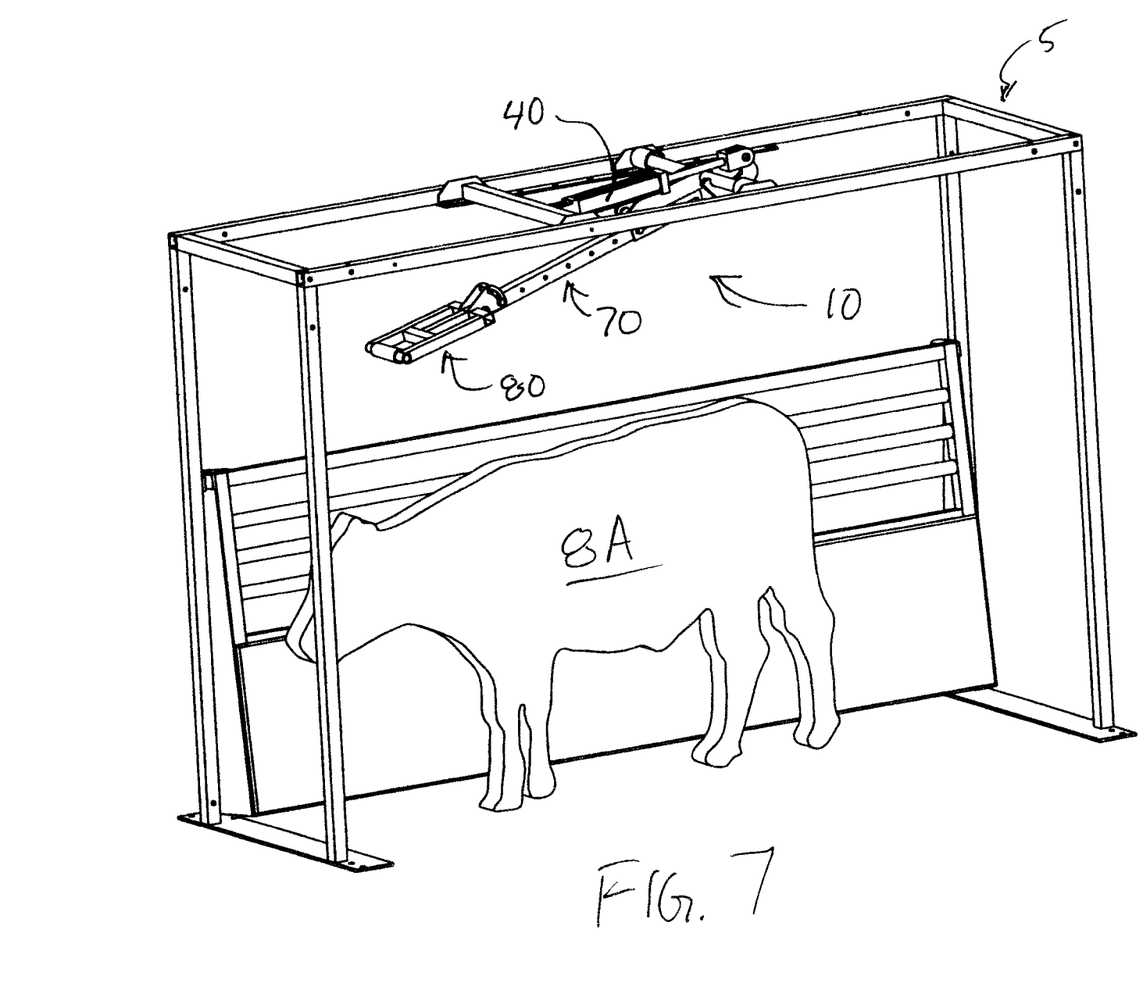
FIG. 7 shows the forward movement assist apparatus in a forth fully raised and fully forwardly pivoted position with the actuator fully extended, the position being suitable for raising the arm assembly above a livestock animal and permitting a second livestock animal to pass beneath the forward movement assist apparatus.

In this example, pivot arm 24 includes two side plates 24A1 and 24A2. A stop member 24S is adjacent to pivot shaft 22 and is fixed between side plates 24A1 and 24A2. The purpose of stop member 24S will also be discussed below. Actuator arm 26 is also fixed to pivot shaft 22 and also extends away from pivot shaft 22 as shown in FIG. 2. In this example, the distal end of actuator arm 26 presents an attachment joint 26A that is suitable for rotatable attachment to actuator 40. Actuator 40 connects between actuator arm 26 and a structure that is either a part of or that is fixed to alleyway 5. In this example, as can be seen in FIG. 1, actuator 40 is pivotably mounted at its proximal end to a cross member 5FC that extends between upper longitudinal members 5FM1 and 5FM2 of frame 5F. In this example, actuator 40 is a hydraulic cylinder that is controlled to move between a retracted position as shown in FIGS. 1 and 4 and an extended position as shown in FIG. 7, as pivot structure 20 rotates between a first pivot structure position as shown in FIGS. 1 and 4 and a second pivot structure position as shown in FIG. 7.

Figure 3:
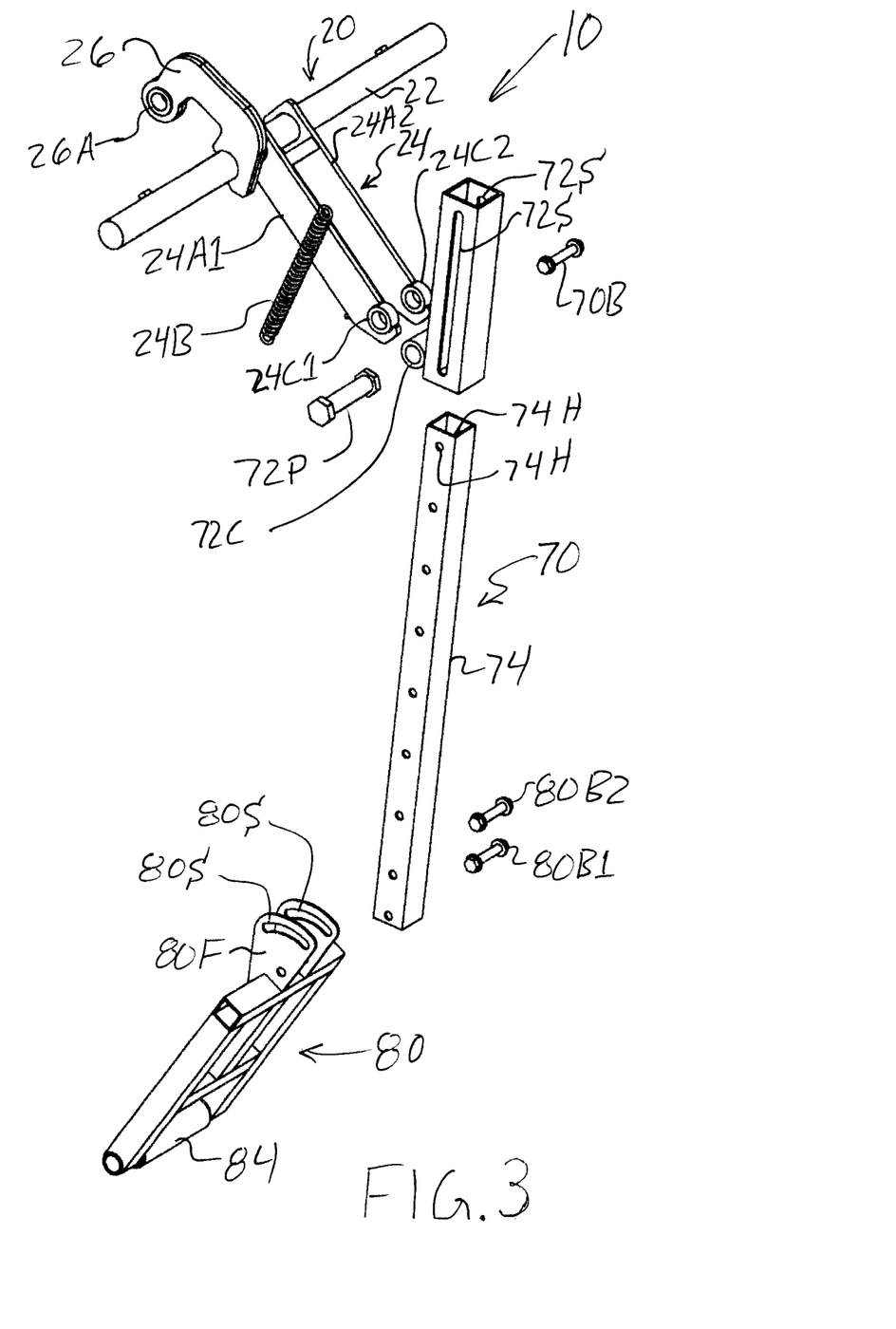
FIG. 3 is an exploded perspective view of one embodiment of the forward movement assist apparatus 10.
Figure 8:
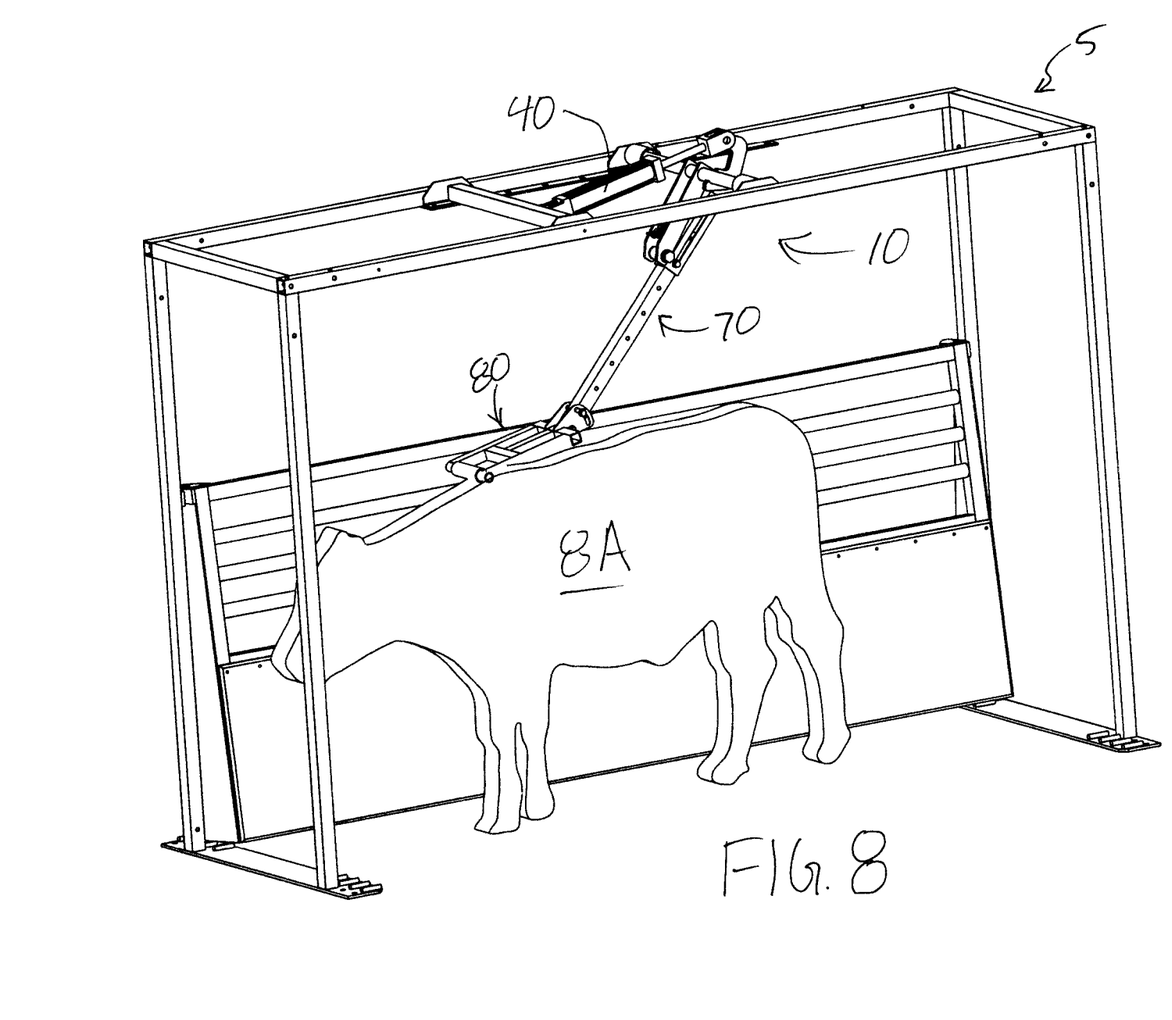
FIG. 8 shows the forward movement assist apparatus in a fifth partially raised and partially forwardly pivoted position as the arm assembly is being pivoted rearwardly so that the arm assembly is able to brush along the back of the second livestock animal.
Figure 9:
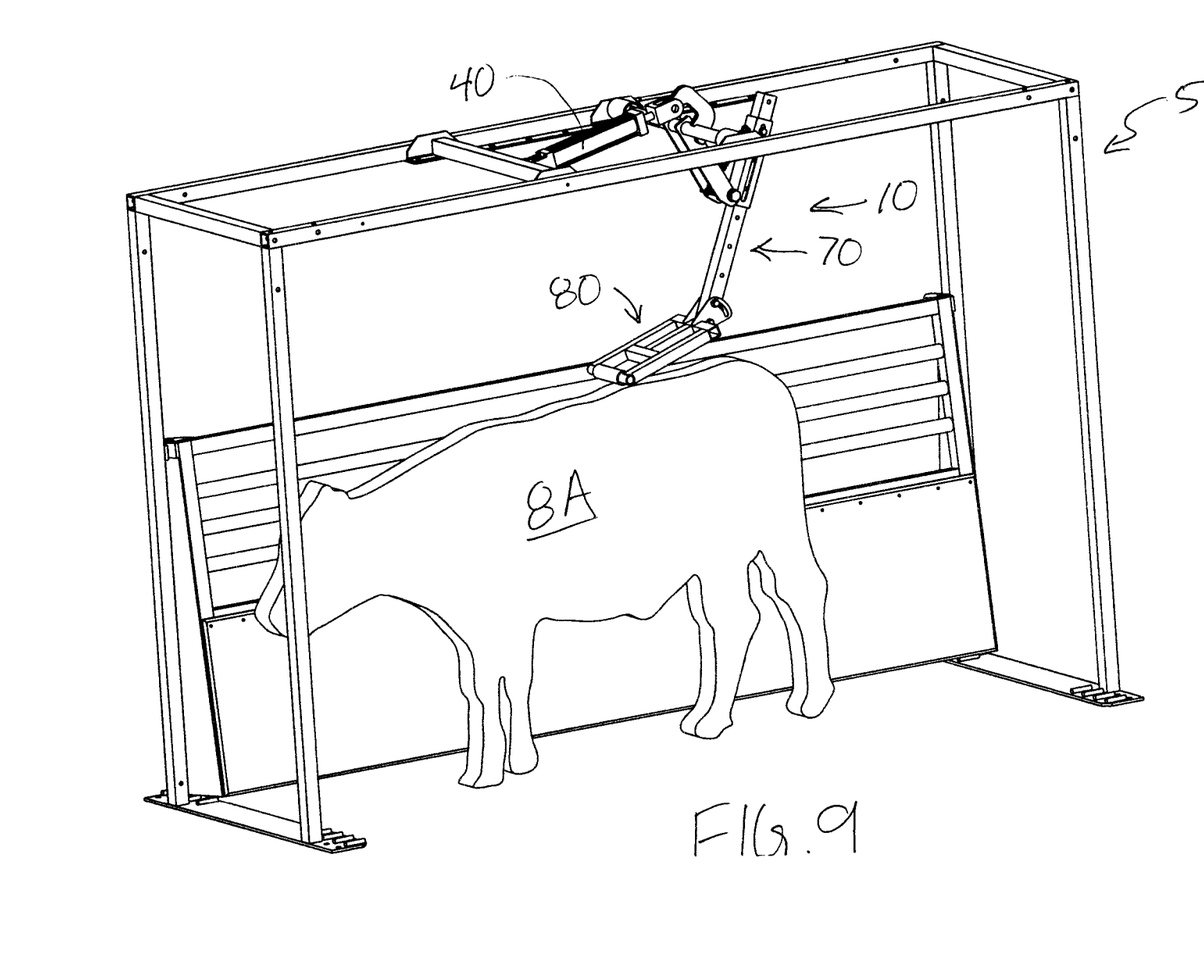
FIG. 9 shows the forward movement assist apparatus in a sixth partially raised and partially forwardly pivoted position wherein the arm assembly has moved rearward in comparison to the position shown in FIG. 8, also suitable for permitting the arm of the apparatus to brush along the back of the second livestock animal until the arm is repositioned to the position shown in FIG. 5 prior to forward urging of the second livestock animal in the same manner as shown for the first livestock animal in FIGS. 5 and 6.

Arm assembly 70 is pivotably mounted to pivot arm 24 of pivot structure 20 at the proximal end of arm assembly 70 so that arm assembly 70 is able to rotate with respect to the pivot structure 20 about a second axis A2 that is also generally normal planes P1 and P2 noted above. Arm assembly 70 includes an outer tube 72, a height selector arm 74 and a paddle attachment 80. Outer tube 72 slidably and adjustably receives a height selector arm 74. Arm assembly 70 is pivotably mounted to pivot arm 24 by a pivot joint that, in this example, includes two opposite corresponding collars 24C1 and 24C2 that are fixed to side plates 24A1 and 24A2 respectively of pivot arm 24 in an aligned fashion, a collar 72C that is fixed to outer tube 72 of arm assembly 70 and a pin 72P that is common to collars 24C1, 72C and 24C2 to complete the joint. The rotation of arm assembly 70 in relation to pivot structure 20 and more particularly in relation to pivot arm 24 ranges between a first retracted position as shown in FIGS. 4-6, 7 and 8 and a second extended position as shown in FIG. 9. As can be seen in FIGS. 2 and 3, arm assembly 70 is not only rotatably mounted to pivot arm 24 as described above but is also biased toward the first retraced position with respect to pivot arm 24 by a tension spring 24B that connects between pivot arm 24 and outer tube 72 of arm assembly 70. When arm assembly 70 is in the first retracted position shown in FIG. 4 or the position shown in FIG. 5, tension spring 24B exerts sufficient force to bring outer tube 72 in contact with stop member 24S. And, when arm assembly 70 is applying force to the hind quarters of a livestock animal as shown in FIG. 6, outer tube 72 is pushed against stop member 24S with greater force than is being applied by tension spring 24B. In FIGS. 1, 4 and 7, for example, tension spring 24B provides sufficient force to overcome the weight of arm assembly 70 which maintains outer tube 72 in a position with respect to pivot arm 24 as shown in FIGS. 1, 4 and 7 such that outer tube 72 is in contact with stop member 24S.

As can also be seen in FIGS. 2 and 3, the overall length of arm assembly 70 is adjustable. As can be seen in FIGS. 2 and 3, outer tube 72 receives height selector arm 74. As can also be seen in FIGS. 2 and 3, outer tube 72 presents opposite side slots 72S and height selector arm 74 presents corresponding opposite side holes 74H. Opposite side holes 74H, in this example, are evenly spaced along much of the length of arm 74. By installing a bolt 70B in selected holes 74H and at a selected position in slots 72S, it is possible to adjust the maximum and minimum lengths of arm assembly 70 within a wide range of lengths in order to accommodate a livestock animals within a wide range of sizes. As can be seen by referring to FIG. 3, bolt 70B is inserted through selected opposite slots 72S and through a selected set of opposite holes 74H (in order to select the desired length for arm assembly 70) and bolt 70B is installed to remain in place it does not clamp arm 74 to outer tube 74 but is loose to allow sliding movement so that height selector arm 74 is able to slide freely in a telescoping manner within outer tube 72 between a first lower limit and a second upper limit. The range of this sliding motion is governed by the length of opposite slots 72S. Thus, arm 74 is free to slide, within limits as defined by slots 72S, but the overall vertical lower and upper limits of the sliding movement of arm 74 may be selected by selecting one pair of opposite holes 74H for receiving bolt 70B. This permits an upward sliding movement of arm 74 relative to outer tube 72 if a follow-on livestock animal 8A is passing under forward assist apparatus 10 as shown in FIG. 9. When arm 74 is not being pushed upwardly by a livestock animal as shown in FIG. 9, then arm 74 is biased by its own weight to be in the extended position shown in FIGS. 4-8.

Paddle attachment 80 is pivotably mounted to the distal end of height selector arm 74. Paddle attachment 80 may optional be at least partially covered by a soft outer covering (not shown) and is intended to make contact with the hind quarters of a livestock animal as shown in FIG. 6. It may be preferable that any soft covering not cover roller 84 as described below. As can be seen in FIG. 2, paddle attachment 80 has two opposite flanges 80F that each present corresponding bolt holes 80H and corresponding arc shaped slots 80S. The lower end of height selector arm 72 also presents bolt holes that correspond with holes 80H and slots 80S. Accordingly, by using bolts 80B1 and 80B2 while it may be possible to mount paddle attachment 80 in a fixed angle selected from a range as allowed by slots 80S, it is preferable to have bolts 80B1 and 80B2 in a loose condition to allow for the free rotation of paddle attachment 80 within the limits defined by the movement of bolt 80B2 within arc shaped slots 80S. This range of motion of paddle attachment 80 facilitates the brushing motion of paddle attachment 80 along the back of follow-on livestock animal 8A as shown in FIGS. 8 and 9 prior to positioning paddle attachment 80 behind a follow-on livestock animal 8A in the same manner as is shown for livestock animal 8 in FIG. 5.

The lower end of paddle attachment 80 presents a transversely oriented roller 84 that is able to rotate freely on a transverse shaft that is fixed to paddle attachment 80. As can be seen in FIGS. 8 and 9, roller 84 is adapted to facilitate the motion of paddle attachment 80 along the back of livestock animal 8A by greatly reducing the friction between paddle attachment 80 and the animal. If the skilled reader refers to FIG. 9, it is possible to envision how paddle attachment 80, which is able to pivot with respect to arm 74, while arm 74 is able to freely slide upwardly as noted above, then, the skilled reader will be able to envision how paddle attachment 80, would be able to move harmlessly along the back of a livestock animal 8A as roller 84 rolls along the back of livestock animal 8A even as livestock animal 8A moves forward in alleyway 5. The skilled reader may also notice that when roller 84 is rolling along the back of livestock animal 8A, sufficient force is being applied to arm assembly 70 to overcome the bias of tension spring 24B thereby permitting outer tube 72 to rotate away from stop member 24S.

FIG. 4 shows the forward movement assist apparatus 10 in a first retracted position. This position is suitable for permitting livestock animal 8 to pass under paddle attachment 80 and into the alleyway. The skilled reader will note that hydraulic cylinder 40 is completely retracted so that arm 70 is in the first position.

Figure 5:
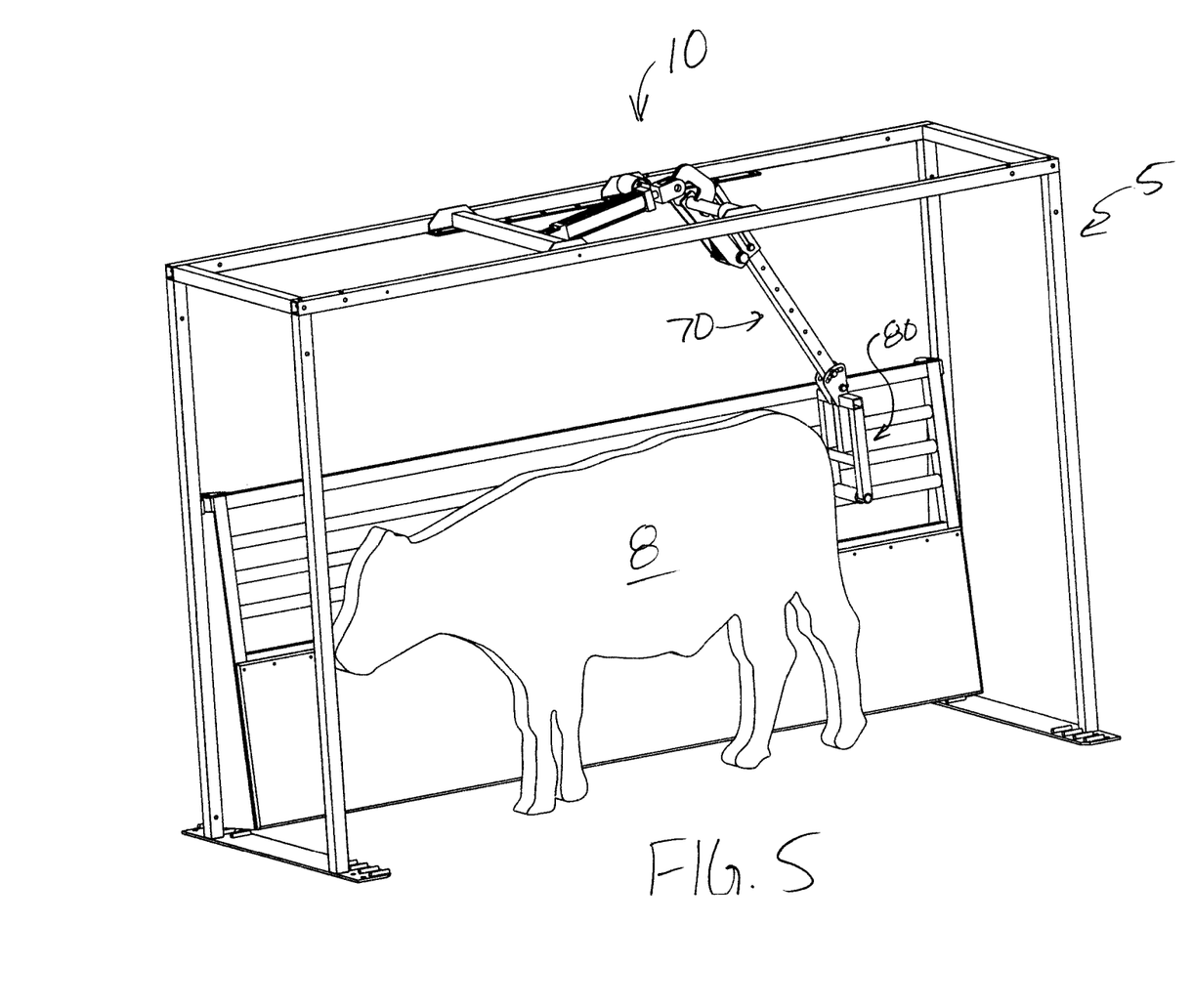
FIG. 5 shows the forward movement assist apparatus in a second lowered position suitable for making contact with the hind quarters of a livestock animal.
Figure 6:
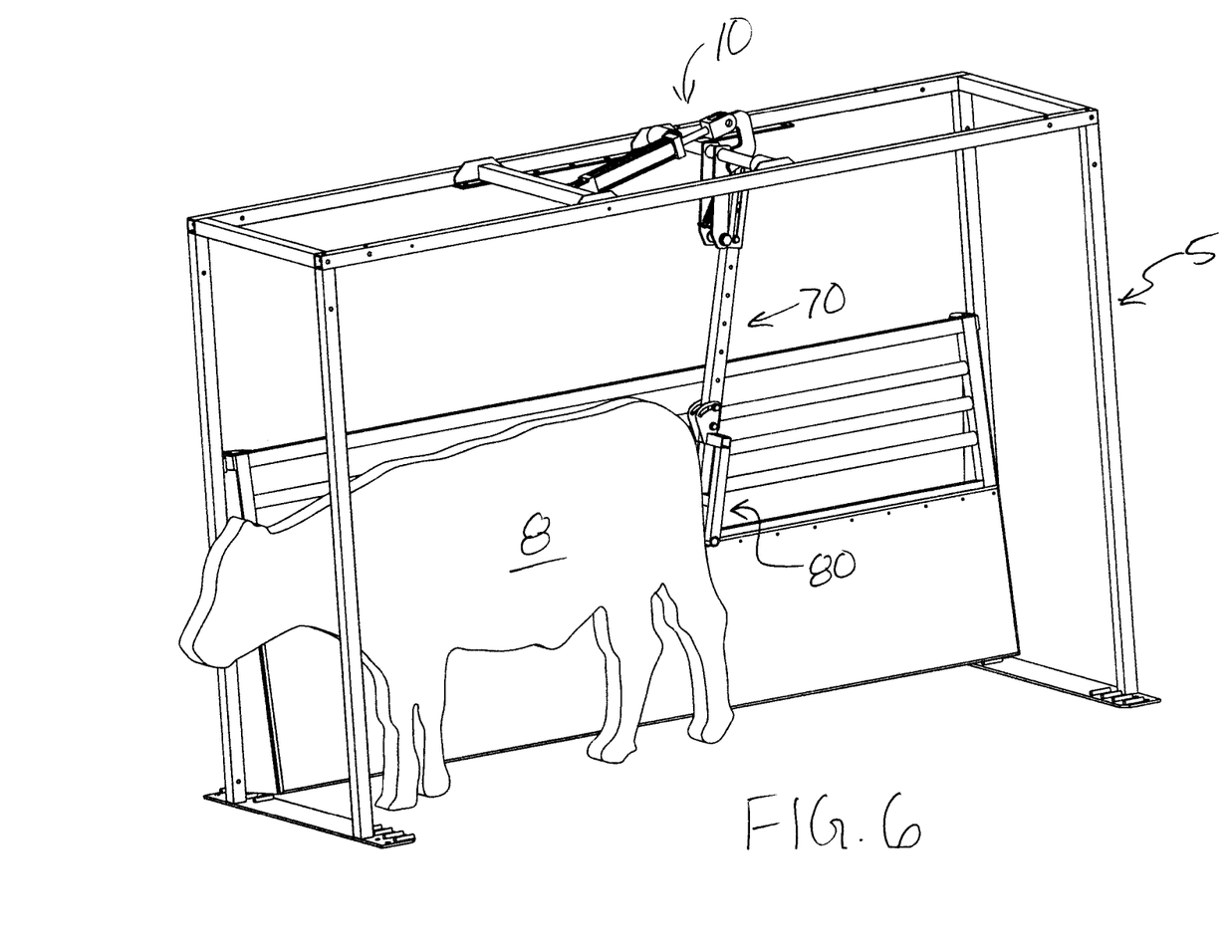
FIG. 6 shows the forward movement assist apparatus in a third lowered forward position suitable for making contact with the hind quarters of a livestock animal and urging that animal in a forward direction.

FIG. 5 shows the forward movement assist apparatus 10 in a second lowered position. This position is suitable for paddle attachment 80 to be brought into contact with the rear quarters of livestock animal 8 whereby livestock animal 8 may be urged in a forward position.

In FIG. 6, forward movement assist apparatus 10 is pushing livestock animal 8 in a forward direction. FIG. 6 shows how forward movement assist apparatus 10, when in the second, lowered position and pivoted forwardly by partially extending hydraulic cylinder 40, is able to be used to urge livestock animal 8 forward in the alleyway. When forward movement assist apparatus 10 is engaged in pushing livestock animal 8, as shown in FIG. 6, arm assembly 70 is rotated counter-clockwise to its counter clockwise limit of motion about axis A2 (shown in FIG. 3) and paddle attachment 80 is also rotated counter clockwise with respect to the lower end of arm assembly 70 to its counter clockwise limit of motion. If another, follow-on livestock animal is not closely following livestock animal 8, the operator should be able to fully retract hydraulic cylinder 40 and thereby return forward movement assist apparatus 10 to the position shown in FIG. 4. If a follow-on livestock animal 8A is closely following animal 8, then the operator would preferably move forward movement assist apparatus 10 to the position shown in FIG. 7 by fully extending hydraulic cylinder 40.

FIG. 7 shows the forward movement assist apparatus 10 in a fully raised and fully forwardly pivoted position suitable permitting a livestock animal to pass beneath forward movement assist apparatus 10. An operator will place forward movement assist apparatus 10 in this position if a follow-on livestock animal 8A closely follows livestock animal 8 into the alleyway. This position is achieved by fully extending hydraulic cylinder 40. The position shown in FIG. 7 insures that forward movement assist apparatus 10 does not hinder the forward movement of a follow-on livestock animal 8A that may be closely following livestock animal 8.

FIGS. 8 and 9 show how forward movement assist apparatus 10 is able to be returned from the fully raised and fully forward position shown in FIG. 7 to a position that is behind a follow-on livestock animal 8A in the same manner as shown for livestock animal 8 in FIG. 5. An operator is able to manipulate forward movement assist apparatus 10 to do this even when the follow-on livestock animal 8A is in the alleyway, or even when more than one follow-on livestock animal is in the alleyway. As is shown in FIG. 8, hydraulic cylinder 40 is being retracted as arm assembly 70 rotates counter-clockwise about its axis of rotation (axis A2 shown in FIG. 3). As this motion progresses, paddle attachment 80 brushes in a rearward direction along the back of the animal until paddle attachment 80 clears the animal and arm assembly 70 assumes the position shown in FIG. 5. This motion is possible because forward movement assist apparatus 10 has multiple degrees of freedom of movement to facilitate this noninvasive movement of paddle attachment 80 along the back of a livestock animal. First, arm assembly 70 is able to rotate in a clockwise direction (clockwise as shown in the figures) about axis A2 relative to pivot arm 24 against the counter clockwise (counter clockwise as shown in the figures) bias of tension spring 24B. This rotational movement can be seen by comparing FIGS. 8 and 9. Secondly, arm 74 is able to slide upwardly against the bias of its own weight in relation to outer tube 72 within the limits defined by the movement of bolt 70B within opposite slots 72S which are presented by outer tube 72. This retracting reverse-telescoping upward movement may be also seen by comparing FIGS. 8 and 9. And, thirdly, paddle attachment 80 is able to rotate clockwise around a joint that includes bolt 80B1 against the bias of its own weight in relation to the distal end of arm 74 by a rotation angle that is governed by the motion of bolt 80B2 within opposite arc shaped slots 80S. This movement may be observed by comparing FIGS. 7 and 8. These degrees of freedom of motion make it possible to move the apparatus between the position shown in FIG. 7 to the position shown in FIG. 5 while minimizing any disturbance to a livestock animal 8A. When paddle attachment 80 clears the back of livestock animal 8A, then arm assembly 70 rotates counter-clockwise because of the bias of spring 24B, arm 74 falls to its lower limit because of its own weight and paddle attachment 80 rotates to its counter-clockwise limit due to its own weight such that forward assist apparatus 10 assumes a position much like that shown in FIG. 5. It is now possible for an operator to urge an animal forward as shown in FIG. 6 or to retract the apparatus to the position shown in FIGS. 1 and 4.

Accordingly, as will be understood by the skilled reader, forward movement assist apparatus 10 may be used to urge the forward movement of an individual or widely spaced livestock animal as well as animals that are closely following each other. Separate or widely spaced animals may be accommodated by sequencing through the positions shown in FIGS. 4, 5 and 6 and then back to the position shown in FIG. 4. And, as will also be appreciated by the skilled reader, a second closely spaced animals may be accommodated by moving the apparatus from the position shown in FIG. 6 as a first animal exits the alleyway, to the position shown in FIG. 7 which is suitable for not hindering a follow-on animal and that it is further possible for an operator to move the apparatus from the position shown in FIG. 7 to the positions shown in FIG. 4 or 5 by transitioning though the positions shown in FIGS. 8 and 9.

It is to be understood that while certain forms of this invention have been illustrated and described, it is not limited thereto, except in so far as such limitations are included in the following claims and allowable equivalents thereof.

The invention claimed is:

1. An apparatus for assisting the forward movement of livestock animals, comprising:
 (a) a livestock alleyway including an alleyway frame and opposite sidewalls that are mounted to the alleyway frame, the sidewalls defining a passageway for the passage of livestock animals that extends in a forward direction from an entrance for receiving livestock animals into the alleyway to an exit for livestock animals to exit the alleyway, the passageway being sufficiently narrow to allow only single file movement of the livestock animals, (b) a pivot shaft that is rotatably mounted to the upper end of the frame for rotation about a first axis that is oriented in the transverse direction, an actuator arm that is fixed to the pivot shaft which extends away from the pivot shaft to present a distal end, an actuator that is connected to the frame at least indirectly and to the distal end of the actuator arm, the actuator for rotating the pivot shaft between a first rotational position when the actuator is fully contracted and a second rotational position when the actuator is fully extended, (c) an arm assembly including a pivot arm that has a proximal end that is fixed to the pivot shaft and a distal end that extends away from the pivot shaft, the arm assembly further including an outer tube that has a lower end and an upper end, the lower end of the outer tube being pivotably mounted to the distal end of the pivot arm for rotation about a second axis that is spaced away and parallel to the first axis, the outer tube being biased toward a first rotational position in which the upper end of the outer tube is in contact at least indirectly with the pivot arm, the outer tube also being able to rotate in response to the application of pressure against the bias to a second rotational position in which the upper end of the outer tube is spaced away from the pivot arm, the outer tube slidably receiving a height selector arm which extends from the lower end of the outer tube, the height selector arm having a proximate end which is received by the outer tube and a distal end that extends away from the outer tube, the height selector arm being arranged for sliding adjustment with respect to the outer tube between a first fully retracted position and a second fully extended position, and a paddle attachment that is rotatably mounted to the distal end of the height selector arm, the paddle attachment having a limited range of motion that is less than 90 angular degrees, the paddle attachment presenting a flat potion suitable for applying pressure to the hind quarters of a livestock animal, the arm assembly being independently operable and independently movable by an operator who is able to independently control the extension and retraction of the actuator, (d) the apparatus for assisting the forward movement of livestock animals being independently controllable by an operator and movable by controlled extension and retraction of the actuator to be in a plurality of positional arrangements including (i) a positional arrangement in which the actuator is fully contracted, the pivot shaft is in the first rotational position and the arm assembly is raised and directed toward the entrance of the alleyway and the upper end of the outer tube of the arm assembly is at least indirectly in contact with the actuator arm in response to the bias of the outer tube toward the actuator arm, (ii) a plurality of positional arrangements in which the actuator extends between the first fully contracted position to the second fully extended position, such that the arm assembly swings away from the entrance of the alleyway and toward the exit of the alleyway and such that the paddle attachment is able to contact the hind quarters of a first livestock animal that is standing under the apparatus in order to urge the first livestock animal to move forward toward the exit of the alleyway as the upper end of the outer tube of the arm assembly is at least indirectly in contact with the actuator arm, and (iii) a positional arrangement in which the actuator is fully extended, the pivot shaft is in the second rotational position and such that the arm assembly is fully raised and directed toward the exit of the alleyway as the upper end of the outer tube of the arm assembly is at least indirectly in contact with the actuator arm, and, (iv) a series of positional arrangements in which the actuator is contracted between the fully extended position to the fully retracted position when a second livestock animal is present beneath the arm assembly such that the paddle attachment comes in contact with the back of the second livestock animal as the arm assembly rotates about the second axis against the bias and the paddle attachment swivels to accomplish a smooth contact and passage of the paddle attachment along the back of the animal until the paddle attachment is able to drop down behind the livestock animal, such that, it is then possible to extend the actuator to bring the paddle attachment into contact with the hind quarters of the second livestock animal in order to urge the forward movement of the livestock animal toward the exit, whereby it is possible for an operator to operate the apparatus in order to assist the forward movement of livestock animals between the above described positional arrangements to gently urge a sequential plurality of livestock animals forward through the livestock alleyway.

2. The apparatus of claim 1, wherein:
the outer tube of the arm assembly further presents opposite slots and the height selector arm presents a plurality of spaced opposite holes such that a height selector arm retaining bolt that is installed through a selected opposite pair of the opposite holes in the height selector arm and through the opposite slots in the outer tube so that the height selector arm is limited in its sliding motion so that the height selector arm is able to move between a first retracted position and a second extended position such that the height of the second extended position has been pre-determined by the selection of the opposite holes in the height selector arm for receiving the height selector arm retaining bolt.

3. The apparatus of claim 1, wherein:
the paddle attachment is able to rotate between a first position in which the paddle attachment is generally aligned with the arm assembly and a second position in which the paddle attachment is angled in a forward direction with respect to the arm assembly by less than 90 angular degrees, and wherein the paddle attachment further includes a roller that is mounted on the distal end of the paddle attachment.

\* \* \* \* \*